F. D. CALKINS & A. C. JOHNSON.
INTERNAL COMBUSTION ENGINE.
APPLICATION FILED JAN. 30, 1913.
1,097,166.
Patented May 19, 1914.
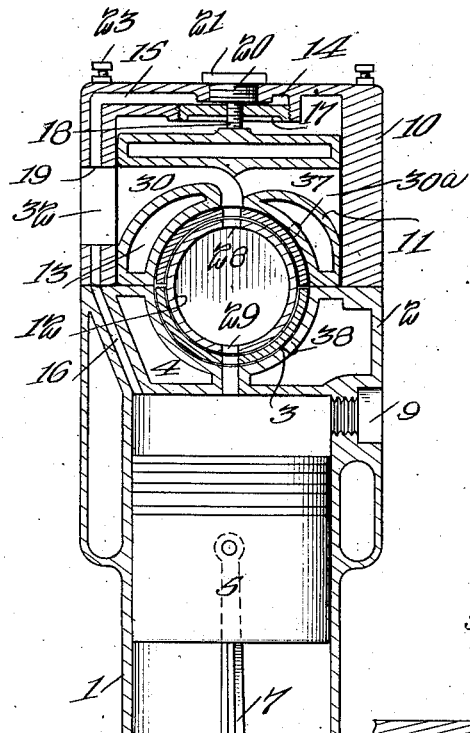
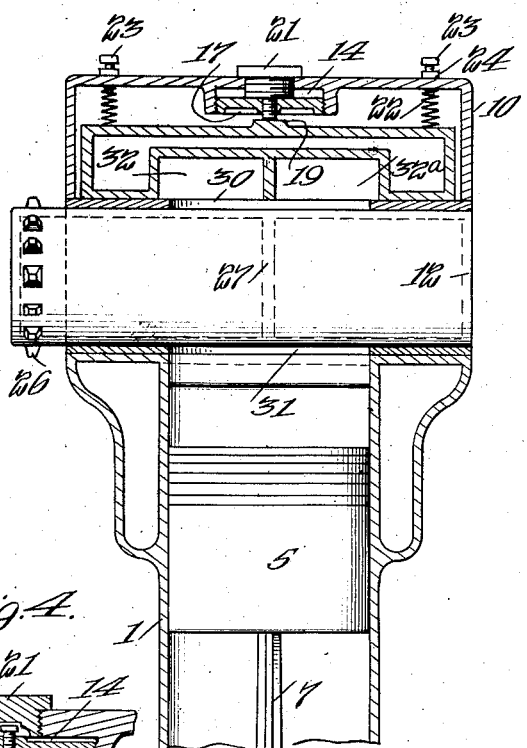
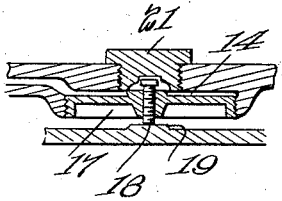
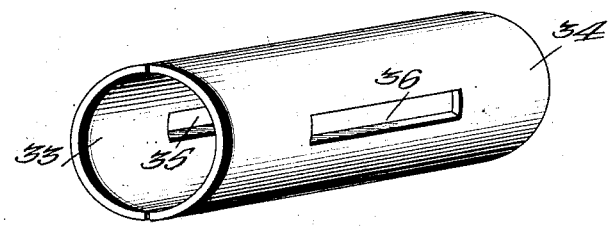
WITNESSES
INVENTORS
FRED D. CALKINS,
ALFRED C. JOHNSON,
BY
ATTORNEYS

UNITED STATES PATENT OFFICE.

FRED D. CALKINS AND ALFRED C. JOHNSON, OF SUNNYVALE, CALIFORNIA.

INTERNAL-COMBUSTION ENGINE.

1,097,166.  Specification of Letters Patent.  Patented May 19, 1914.

Application filed January 30, 1913. Serial No. 745,213.

*To all whom it may concern:*

Be it known that we, FRED D. CALKINS and ALFRED C. JOHNSON, citizens of the United States, and residents of Sunnyvale, in the county of Santa Clara and State of California, have invented a new and useful Improvement in Internal-Combustion Engines, of which the following is a specification.

Our invention is an improvement in internal combustion engines, and has for its object the provision of a removable liner for the valve chambers of the engines shown in our co-pending applications, Serial No. 695,847, filed May 8, 1912; Serial No. 677,655, filed Feb. 15, 1912; Serial No. 695,848, filed May 8, 1912 and Serial No. 718,247, filed Sept. 3, 1912, for permitting the said linings to be removed when worn and replaced by others.

In the drawings: Figure 1 is a vertical section of one type of engine provided with the improved liner, Fig. 2 is a section at right angles to Fig. 1, Fig. 3 is a perspective view of one of the liners removed, and Fig. 4 is an enlarged detail view of the diaphragm and its connection.

The engine shown in the drawings consists of a cylinder 1, having at its outer end the inner section of a bearing chamber 2, the outer face of the said section being recessed transversely to form one section 3 of a cylindrical bearing, and the said section is chambered as shown at 4, to permit the circulation of a cooling fluid.

The piston 5 is provided with the usual piston rings 6, and is connected to the crank shaft (not shown) by means of a rod 7. The outer end of the cylinder is also chambered or jacketed as shown at 8 for the circulation of a cooling fluid and a threaded opening 9 is provided at the extreme outer end for receiving a spark plug of suitable character, for igniting the charge.

It will be noted from an inspection of Fig. 1 that when the piston is at the end of its outward stroke, a space is left between the outer end of the cylinder and the outer end of the piston, the said space forming a combustion chamber, into which the spark plug will extend when inserted in the opening 9. A cap 10 is connected with the outer end of the inner section of the valve chamber in any suitable manner and within the cap the outer bearing section 11 is arranged, the said section being recessed transversely on its inner face to form the outer bearing for the valve 12. The outer bearing section 11 is chambered as shown at 13, to permit the circulation of a cooling fluid, and mechanism is provided for pressing the said section toward the inner section. The cap 10 has a recess 14 on its inner face at its outer end, the said recess being internally threaded as shown, and by means of passages 15 and 16 in the cap wall and the wall of the inner bearing section respectively, the recess 14 is in communication with the combustion chamber of the cylinder, so that the variations of pressure in the said combustion chamber are transmitted to the recess 14. A diaphragm 17 is threaded into the recess 14, and the said diaphragm has a central opening through which is passed a screw 18, whose inner end bears against a boss 19 on the outer face of the outer bearing section 11. The outer end of the cap is provided with a threaded opening and a plug 20 is threaded into the opening, the said plug having a flange 21 fitting against the outer face of the cap 10 and the inner end of the plug is recessed as indicated at 25 to provide room for the head of the screw 18. Springs 22 are arranged between the cap and the outer bearing section, each spring bearing at its inner end against the bearing section and at its outer end against the set screw 23 threaded through the cap and engaging the spring. By means of the set screws the tension of the springs may be adjusted, and lock nuts 24 are provided for locking the set screws in adjusted position. The springs 22 hold the outer bearing section firmly in contact with the rotary valve 12, while at the same time they permit the bearing section to yield.

It will be noted from an inspection of Fig. 1 that the movable bearing section does not fit closely against the outer face of the inner section, but a sufficient space is left to permit the said movable section to move toward the fixed section. The valve 12 is provided at one end with an annular series 26 of sprocket teeth, which are adapted to receive a chain to connect the valve with the crank shaft (not shown) and the said valve 12 is hollow and is provided with the central transverse partition 27. The valve is also provided with oppositely arranged series of ports 28 and 29, one of the ports of the series 28 and 29 opening on each side of the partition 27. The ports are adapted to register with ports 30 and 30ª in the outer bearing section and with a port 31 in the inner bearing section. The port 31 extends diametrically of the cylinder while the ports 30 and 30ª extend in opposite directions in the outer bearing section and register with ports 32 and 32ª in the cap to place the cylinder in communication alternately with the atmosphere and with a source of fuel supply. During the explosion of a charge in the cylinder, the outward pressure on the valve is greater than at other times, and it is impossible to arrange a spring, so that it will furnish the exact degree of tension necessary during the explosion to make uniform pressure on the valve. By arranging the diaphragm in the recess which is in communication with the explosion chamber, the pressure on the valve is equalized during the explosion, and is uniform at all times. The springs 22 are sufficiently strong to hold the outer section firmly in place, normally, and during an explosion, the diaphragm gives the additional pressure needed.

The above construction forms the subject-matter of our above mentioned co-pending application, Serial No. 718,247 and is shown and described in the said co-pending application. The subject of the present invention is the liner shown in Fig. 3, the said liner consisting of two similar semi-cylindrical sections 33 and 34, the said sections when arranged as shown in Fig. 3, forming a cylindrical lining or bushing, adapted to be arranged between the valve 12 and the respective sections of the bearing chamber. The respective sections 33 and 34 have longitudinal passages 35 and 36 respectively, which register with the ports 30, 30ª and 31 of the valve chamber when the lining is in place. Dowel pins 37 and 38 are provided for holding the sections of the liner in place and for preventing either angular or longitudinal movement of the said sections. Each of the said dowel pins is connected with a liner section and engages an opening in the adjacent section of the bearing or valve chamber.

It will be understood that the improved liner can be used in connection with any type of engine, having a rotating valve and a sectional bearing chamber, but it is especially adapted for use with the engine shown in the above mentioned co-pending application.

We claim:—

1. In an engine, the combination with the cylinder and the rotating cylindrical valve at the outer end thereof, of a sectional bearing chamber for the valve, one of the sections of the chamber being connected to the cylinder, and the other section being movable toward and from the first-named section, means in connection with the engine for transmitting the pressure from the combustion chamber of the cylinder to the movable bearing section to cause the pressure exerted by the said section on the valve to vary with the variations of pressure in the combustion chamber, springs normally pressing the movable section toward the fixed section, means for varying the tension of the springs, a removable lining between the valve and the bearing chamber, the said lining consisting of similar semi-cylindrical sections, each section having a radial dowel pin, one of the sections of the lining being arranged adjacent to each section of the bearing chamber, each of the said bearing chamber sections having an opening for receiving the dowel pin to fix the lining with respect to the bearing chamber section.

2. In an engine, the combination with the cylinder and the rotating cylindrical valve at the outer end thereof, of a sectional bearing chamber for the valve, one of the sections of the chamber being connected to the cylinder, and the other section being movable toward and from the first-named section, means in connection with the engine for transmitting the pressure from the combustion chamber of the cylinder to the movable bearing section to cause the pressure exerted by the said section on the valve to vary with the variations of pressure in the combustion chamber, springs normally pressing the movable section toward the fixed section, means for varying the tension of the spring, a removable sectional lining between the valve and the bearing chamber, and means in connection with the said lining and the bearing chamber sections for preventing movement of the lining sections with respect to the bearing chamber sections.

3. In an engine, the combination with the cylinder and the rotating cylindrical valve at the outer end thereof, of a sectional bearing chamber for the valve, one of the sections of the chamber being connected to the cylinder and the other section being movable toward and from the first-named section, means in connection with the engine for transmitting the pressure from the combustion chamber of the cylinder to the movable bearing section to cause the pressure exerted by the said section on the valve to vary with the variations of pressure in the combustion chamber, a removable sectional lining between the valve and the bearing chamber, and means in connection with the said lining and the bearing chamber sections for preventing movement of the lining sections with respect to the bearing chamber sections.

4. In an engine, the combination with the cylinder and the rotating cylindrical valve at the outer end thereof, of a sectional bearing chamber for the valve, one of the sections of the chamber being connected to the cylinder and the other section being movable toward and from the first-named section, a removable lining between the valve and the bearing chamber, said lining being sectional, each of the sections fitting a section of its bearing chamber, and means in connection with each of the said sections and the adjacent bearing chamber section for preventing relative movement.

5. In an engine, the combination with the cylinder and the rotating cylindrical valve, of a sectional bearing chamber for the valve, one of the sections of the chamber being connected to the cylinder and the other section being movable toward and from the first-named section, a removable sectional lining for the bearing chamber, and a connection between each section of the lining and one of the sections of the bearing chamber for preventing angular movement of the lining section with respect to the bearing chamber section.

FRED D. CALKINS.
ALFRED C. JOHNSON.

Witnesses:
 EMIL W. SNYDER,
 HELEN M. SAMPSON.